United States Patent
Ota et al.

(10) Patent No.: US 9,515,861 B2
(45) Date of Patent: Dec. 6, 2016

(54) PEAK SUPPRESSION APPARATUS

(71) Applicant: FUJITSU LIMITED, Kawasaki-shi, Kanagawa (JP)

(72) Inventors: Tomoya Ota, Kawasaki (JP); Hiroyoshi Ishikawa, Kawasaki (JP); Kazuo Nagatani, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/697,897

(22) Filed: Apr. 28, 2015

(65) Prior Publication Data

US 2015/0372850 A1 Dec. 24, 2015

(30) Foreign Application Priority Data

Jun. 19, 2014 (JP) ................................. 2014-126703

(51) Int. Cl.
*H04K 1/02* (2006.01)
*H04L 25/03* (2006.01)
*H04L 25/49* (2006.01)
*H04L 27/26* (2006.01)

(52) U.S. Cl.
CPC ................................. *H04L 27/2624* (2013.01)

(58) Field of Classification Search
None
See application file for complete search history.

(56) References Cited

U.S. PATENT DOCUMENTS

| | | | | |
|---|---|---|---|---|
| 5,444,697 A | * | 8/1995 | Leung | ..................... H04L 7/027 370/207 |
| 2006/0133524 A1 | * | 6/2006 | Hamada | .............. H04L 27/2614 375/260 |
| 2009/0191923 A1 | * | 7/2009 | Fudaba | ................. H03F 1/0211 455/571 |

FOREIGN PATENT DOCUMENTS

| | | |
|---|---|---|
| JP | 2002-305489 | 10/2002 |
| JP | 2014-027343 | 2/2014 |

* cited by examiner

*Primary Examiner* — Chieh M Fan
*Assistant Examiner* — Wednel Cadeau
(74) *Attorney, Agent, or Firm* — Fujitsu Patent Center

(57) ABSTRACT

A peak suppression apparatus includes an acquiring unit that acquires a first signal represented by an amplitude waveform of a multicarrier signal, a generator that generates a second signal represented by a waveform sequentially connecting a plurality of peak points adjacent to one another in the first signal as a peak detection signal for the multicarrier signal, a detector that detects a peak value and a peak timing of the multicarrier signal by using the peak detection signal, and a suppressing unit that suppresses a peak of the multicarrier signal based on the peak value and the peak timing.

3 Claims, 14 Drawing Sheets

PEAK SUPPRESSION APPARATUS

CROSS-REFERENCE TO RELATED APPLICATION

This application is based upon and claims the benefit of priority of the prior Japanese Patent Application No. 2014-126703, filed on Jun. 19, 2014, the entire contents of which are incorporated herein by reference.

FIELD

The embodiments discussed herein are related to a peak suppression apparatus.

BACKGROUND

Radio transmission apparatuses in radio communication systems are provided with a power amplifier (PA) that amplifies the electrical power of a transmission signal. In the radio transmission apparatuses, in general, the PA is operated near the saturation region of the PA to increase the power efficiency of the PA.

In recent years, to improve the utilization efficiency of frequencies, there have been cases in which the signal transmitted from the radio transmission apparatus is a "multicarrier signal" that includes signals of a plurality of carrier frequencies different from one another. The multicarrier signal, as one example, includes an orthogonal frequency division multiplexing (OFDM) signal. The multicarrier signal, however, tends to provide a high peak to average power ratio (PAPR). Thus, when the multicarrier signal is input to the PA that operates near the saturation region, the signal waveform output from the PA is to distort due to the influence of nonlinear distortion of the PA.

Hence, in the radio transmission apparatus that transmits a multicarrier signal, "peak suppression" is performed in which peak amplitude (may simply be referred to as a "peak" hereinafter) of the multicarrier signal input to the PA is suppressed in advance before inputting.

One method of peak suppression includes, as illustrated in FIG. 1, a method that adds to the multicarrier signal a suppression signal coinciding with the timing of a peak (may be referred to as "peak timing" hereinafter) that arises in the amplitude waveform of the multicarrier signal. The amount of subtraction that is the amount of addition in negative, that is, the amount of suppression is obtained from the difference between a peak value and a target value. As the suppression signal, an impulse response signal is used. Consequently, the peak of the multicarrier signal is suppressed to the target value, and thus the linearity of the signal output from the PA can be maintained. FIG. 1 is a chart illustrating one example of the peak suppression. An example of related-art is described in Japanese Laid-open Patent Publication No. 2014-027343.

As an interval between two carriers adjacent to each other (may be referred to as a "carrier interval" hereinafter) in the multicarrier signal widens, as illustrated in FIG. 2, the variation in amplitude of the multicarrier signal in the time axis direction becomes sharp. Hence, when the carrier interval widens, there are cases in which a plurality of peaks (for example, eight peaks) exceeding the target value are detected within a short time range. FIG. 2 is a diagram for explaining the problem.

In response to these eight peaks, adding the impulse response signal coinciding with each of the eight peaks to the multicarrier signal results in excess peak suppression in which the peaks are greatly lowered than the target value. Consequently, when a plurality of peaks that exceed the target value are detected within a short time range, it is preferable that the timing of adding the impulse response signal be determined so that it will coincide with one of a plurality of peak timings corresponding to the peaks. However, determining single optimal timing of adding the impulse response signal out of the peak timings in response to various patterns of the multicarrier signal complicates the processing and expands the circuit scale of the radio transmission apparatus.

SUMMARY

According to an aspect of an embodiment, a peak suppression apparatus includes an acquiring unit that acquires a first signal represented by an amplitude waveform of a multicarrier signal, a generator that generates a second signal represented by a waveform sequentially connecting a plurality of peak points adjacent to one another in the first signal as a peak detection signal for the multicarrier signal, a detector that detects a peak value and a peak timing of the multicarrier signal by using the peak detection signal, and a suppressing unit that suppresses a peak of the multicarrier signal based on the peak value and the peak timing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The embodiments discussed herein, however, are not intended to limit the peak suppression apparatus disclosed in the application. The constituent units having the same function in the respective embodiments are given the same reference symbols or numerals, and their redundant explanations are omitted.

[a] First Embodiment

Configuration of Radio Transmission Apparatus

Figure 3:
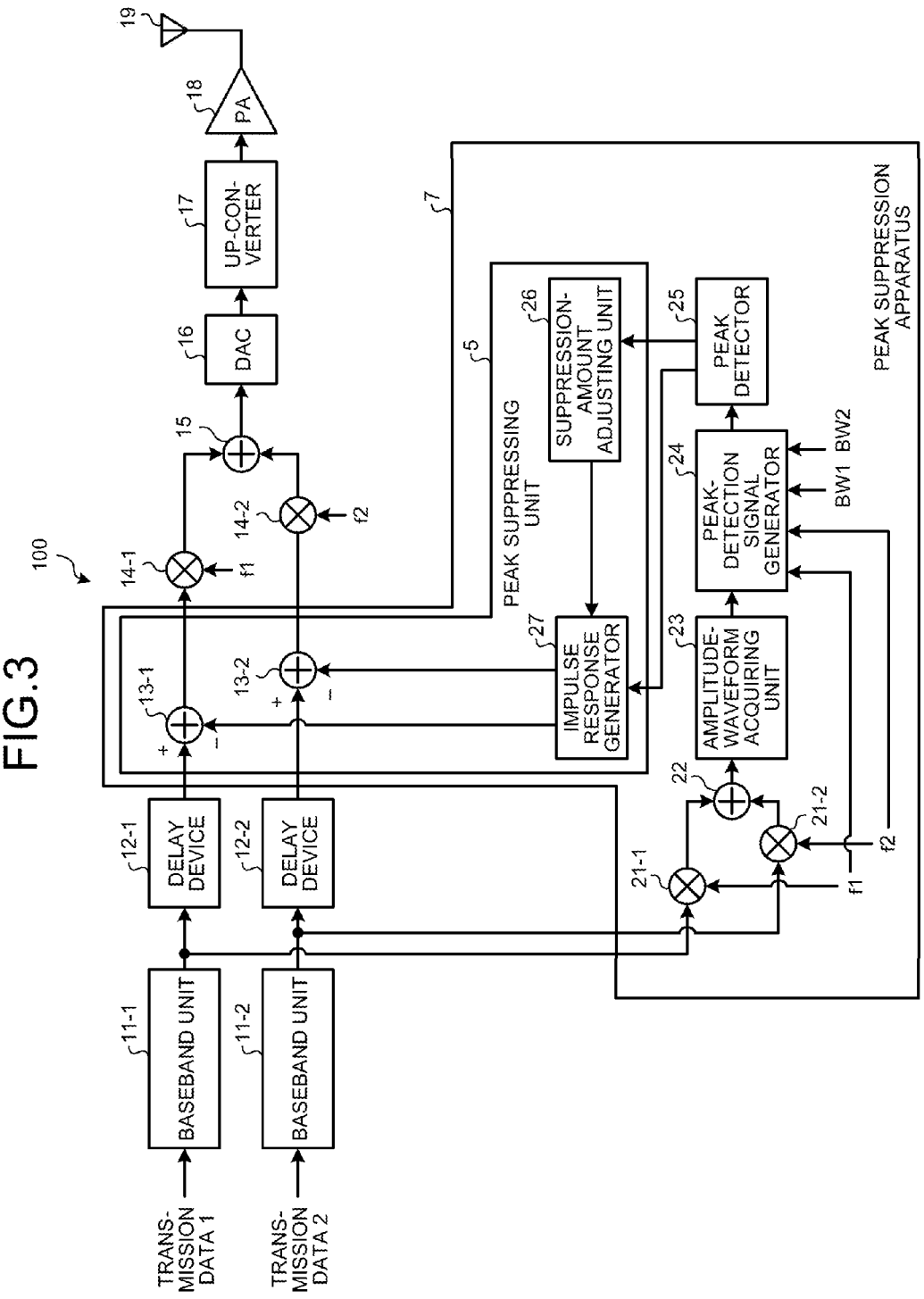
FIG. 3 is a block diagram illustrating an example of the configuration of a radio transmission apparatus according to a first embodiment.

FIG. 3 is a block diagram illustrating an example of the configuration of a radio transmission apparatus according to a first embodiment. In FIG. 3, a radio transmission apparatus 100 includes baseband units 11-1 and 11-2, delay devices 12-1 and 12-2, a peak suppression apparatus 7, multipliers 14-1 and 14-2, an adder 15, and a digital-to-analog converter (DAC) 16. The radio transmission apparatus 100 further includes an up-converter 17, a PA 18, and an antenna 19.

The peak suppression apparatus 7 includes multipliers 21-1 and 21-2, an adder 22, an amplitude-waveform acquiring unit 23, a peak-detection signal generator 24, a peak detector 25, and a peak suppressing unit 5.

The peak suppressing unit 5 includes a suppression-amount adjusting unit 26, an impulse response generator 27, and subtracters 13-1 and 13-2.

The baseband unit 11-1 generates a transmission baseband signal 1 by performing baseband processing such as encoding and modulation on transmission data 1 received, and outputs the generated transmission baseband signal 1 to the delay device 12-1 and the multiplier 21-1. The baseband unit 11-2 generates a transmission baseband signal 2 by performing baseband processing such as encoding and modulation on transmission data 2 received, and outputs the generated transmission baseband signal 2 to the delay device 12-2 and the multiplier 21-2.

The transmission data 1 is the data assigned to a carrier frequency f1 of a multicarrier signal, and the transmission data 2 is the data assigned to a carrier frequency f2 of the multicarrier signal. That is, the radio transmission apparatus 100 generates the multicarrier signal including the signals of a plurality of carrier frequencies f1 and f2 different from each other.

Figure 4:
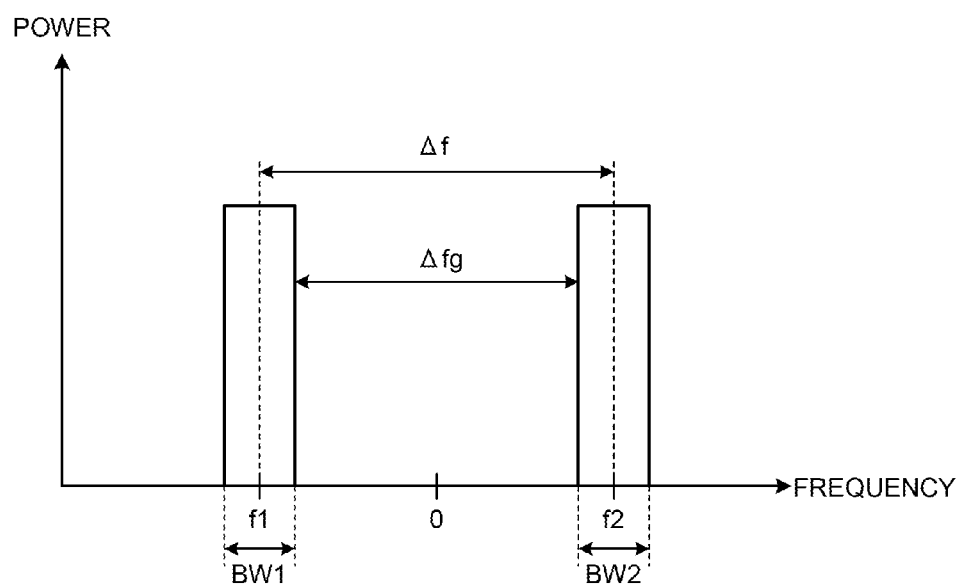
FIG. 4 is a chart illustrating one example of a multicarrier signal in the first embodiment.

FIG. 4 is a chart illustrating one example of the multicarrier signal in the first embodiment. As illustrated in FIG. 4, the multicarrier signal has two carrier frequencies of a carrier f1 of the frequency f1 and a carrier f2 of the frequency f2, for example. The carrier f1 and the carrier f2 are adjacent to each other. The carrier f1 has a carrier bandwidth of BW1 and the carrier f2 has a carrier bandwidth of BW2. Normally, the BW1 and BW2 are of the same value "bw." A carrier interval between the carrier f1 and the carrier f2 is defined by "Δf" or "Δfg." The Δf is an interval between the frequency f1 that is the center frequency in the BW1 and the frequency f2 that is the center frequency in the BW2. The Δfg is an interval between a maximum frequency in the BW1, that is, "f1+(BW1/2)" and a minimum frequency in the BW2, that is, "f2−(BW2/2)."

In FIG. 3, the delay device 12-1 delays the transmission baseband signal 1 by a delay amount D, and outputs the transmission baseband signal 1 after delay to the subtracter 13-1. The delay device 12-2 delays the transmission baseband signal 2 by the delay amount D, and outputs the transmission baseband signal 2 after delay to the subtracter 13-2. The total amount of delay in processing at the multipliers 21-1 and 21-2, the adder 22, the amplitude-waveform acquiring unit 23, the peak-detection signal generator 24, the peak detector 25, the suppression-amount adjusting unit 26, and the impulse response generator 27 is defined as the delay amount D.

The subtracter 13-1 performs peak suppression on the transmission baseband signal 1 by subtracting an impulse response signal received from the impulse response generator 27 from the transmission baseband signal 1 after delay, and outputs the transmission baseband signal 1 after peak suppression to the multiplier 14-1. The subtracter 13-2 performs peak suppression on the transmission baseband signal 2 by subtracting an impulse response signal received from the impulse response generator 27 from the transmission baseband signal 2 after delay, and outputs the transmission baseband signal 2 after peak suppression to the multiplier 14-2.

The multiplier 14-1 generates a carrier signal 1 of the frequency f1 by multiplying the transmission baseband signal 1 after peak suppression by the carrier frequency f1, and outputs the generated carrier signal 1 to the adder 15. The multiplier 14-2 generates a carrier signal 2 of the frequency f2 by multiplying the transmission baseband signal 2 after peak suppression by the carrier frequency f2, and outputs the generated carrier signal 2 to the adder 15.

The adder 15 adds and combines the carrier signal 1 and the carrier signal 2, and outputs the combined signal to the DAC 16. Thus, the signal output from the adder 15 is to be a multicarrier signal that includes the carrier signal 1 and the carrier signal 2. The signal output from the adder 15 is to be the multicarrier signal on which the peak suppression has been performed.

The DAC 16 converts the multicarrier signal from a digital signal into an analog signal and outputs it to the up-converter 17.

The up-converter 17 up-converts the analog multicarrier signal and outputs the multicarrier signal after up-conversion to the PA 18.

The PA 18 amplifies the electrical power of the multicarrier signal after up-conversion and outputs the multicarrier signal after power amplification to the antenna 19.

The antenna 19 wirelessly transmits the multicarrier signal after power amplification.

The multiplier 21-1 generates a carrier signal 1' of the frequency f1 by multiplying the transmission baseband signal 1 by the carrier frequency f1, and outputs the generated carrier signal 1' to the adder 22. The multiplier 21-2 generates a carrier signal 2' of the frequency f2 by multiplying the transmission baseband signal 2 by the carrier frequency f2, and outputs the generated carrier signal 2' to the adder 22.

The adder 22 adds and combines the carrier signal 1' and the carrier signal 2', and outputs the combined signal to the amplitude-waveform acquiring unit 23. Thus, the signal output from the adder 22 is to be a multicarrier signal that includes the carrier signal 1' and the carrier signal 2'. This multicarrier signal is equivalent to a multicarrier signal on which the peak suppression is not performed, and may be referred to as a replica signal.

The amplitude-waveform acquiring unit 23 acquires a signal represented by an amplitude waveform of the multicarrier signal (may be referred to as an "amplitude signal" hereinafter), and outputs the acquired amplitude signal to the peak-detection signal generator 24.

The peak-detection signal generator 24 receives respective signals representing the carrier frequencies f1 and f2 and the carrier bandwidths BW1 and BW2. The peak-detection signal generator 24 generates a signal represented by a waveform sequentially connecting a plurality of peak points adjacent to one another in the amplitude signal (may be referred to as a "peak-coupled signal" hereinafter) based on the f1, f2, BW1, and BW2. The generation of the peak-coupled signal in detail will be described later. The peak-detection signal generator 24 outputs the generated peak-coupled signal to the peak detector 25. That is, the peak-detection signal generator 24 generates the peak-coupled signal as a signal to detect a peak of the multicarrier signal (may be referred to as a "peak detection signal" hereinafter).

The peak detector 25 detects a peak value and peak timing of the multicarrier signal by using the peak detection signal, and outputs the detected peak value to the suppression-amount adjusting unit 26 and outputs the detected peak timing to the impulse response generator 27.

The peak suppressing unit 5 suppresses the peak of the multicarrier signal based on the peak value and peak timing received from the peak detector 25 in the following manner.

More specifically, the suppression-amount adjusting unit 26 calculates a value of one-half of the difference between the peak value and a target value as the amount of suppression, and outputs the calculated amount of suppression to the impulse response generator 27.

The impulse response generator 27 generates an impulse response signal having a maximum amplitude that is equal to the amount of suppression received from the suppression-amount adjusting unit 26 at the peak timing received from the peak detector 25, and outputs it to each of the subtracters 13-1 and 13-2. That is, the impulse response generator 27 outputs, coinciding with the peak timing, the impulse response signal having the maximum amplitude of the value of one-half of the difference between the peak value and the target value to each of the subtracters 13-1 and 13-2 as a suppression signal.

Then, as described above, the subtracter 13-1 performs the peak suppression on the transmission baseband signal 1 by subtracting the impulse response signal received from the impulse response generator 27 from the transmission baseband signal 1 after delay. The subtracter 13-2 performs the peak suppression on the transmission baseband signal 2 by subtracting the impulse response signal received from the impulse response generator 27 from the transmission baseband signal 2 after delay.

<Operation of Radio Transmission Apparatus>

Figure 5:
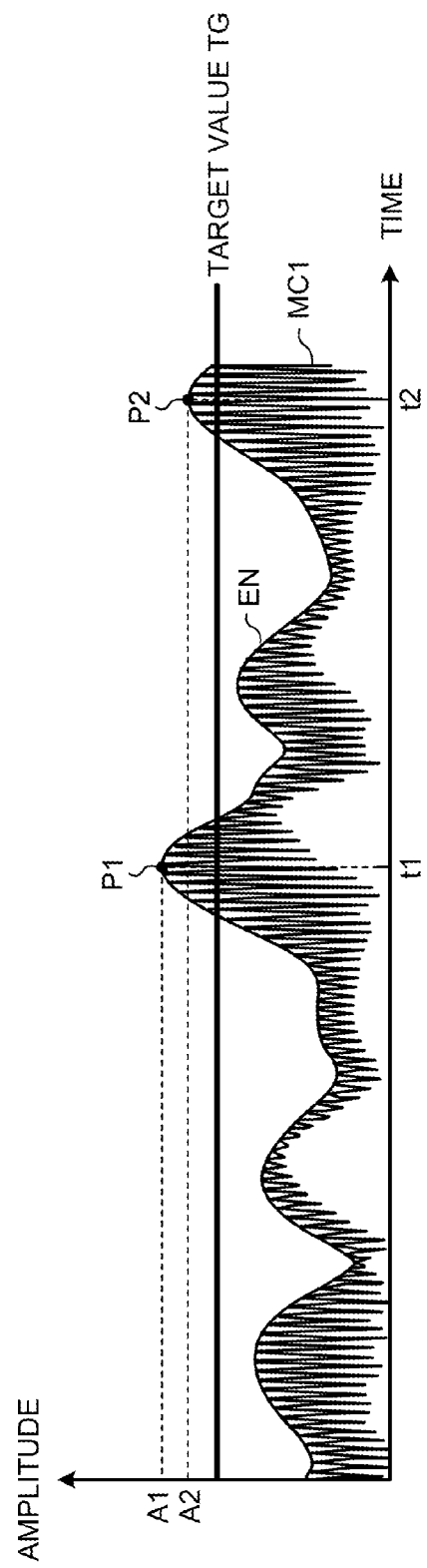
FIG. 5 is a chart for explaining the operation of the radio transmission apparatus in the first embodiment.

FIG. 5 is a chart for explaining the operation of the radio transmission apparatus in the first embodiment.

The amplitude-waveform acquiring unit 23 acquires an amplitude signal MC1 from the multicarrier signal received from the adder 22.

The peak-detection signal generator 24 generates a peak-coupled signal EN from the amplitude signal MC1.

The peak detector 25 detects, by using the peak-coupled signal EN as a peak detection signal, peaks P1 and P2, which exceed a target value TG, of the peak-coupled signal EN, and peak timing t1 of the peak P1 and peak timing t2 of the peak P2. The peak detector 25 further detects a peak value A1 of the peak P1 and a peak value A2 of the peak P2.

The suppression-amount adjusting unit 26 calculates "(A1−TG)/2" as the amount of suppression at the peak timing t1. The suppression-amount adjusting unit 26 further calculates "(A2−TG)/2" as the amount of suppression at the peak timing t2.

The impulse response generator 27 generates an impulse response signal I1 having "(A1−TG)/2" as a maximum amplitude at the peak timing t1 and outputs it to the subtracters 13-1 and 13-2. The impulse response generator 27 further generates an impulse response signal I2 having "(A2−TG)/2" as a maximum amplitude at the peak timing t2 and outputs it to the subtracters 13-1 and 13-2.

Consequently, coinciding with the peak timing t1, the impulse response signal I1 is subtracted from the transmission baseband signal 1 in the subtracter 13-1, and the impulse response signal I1 is subtracted from the transmission baseband signal 2 in the subtracter 13-2. Furthermore, coinciding with the peak timing t2, the impulse response signal I2 is subtracted from the transmission baseband signal 1 in the subtracter 13-1, and the impulse response signal I2 is subtracted from the transmission baseband signal 2 in the subtracter 13-2. Thus, each of the peak P1 and peak P2 is suppressed down to the target value TG. That is, the signal output from the adder 15 is to be the multicarrier signal in which the peaks are suppressed.

<Configuration of Peak-Detection Signal Generator>

Figure 6:
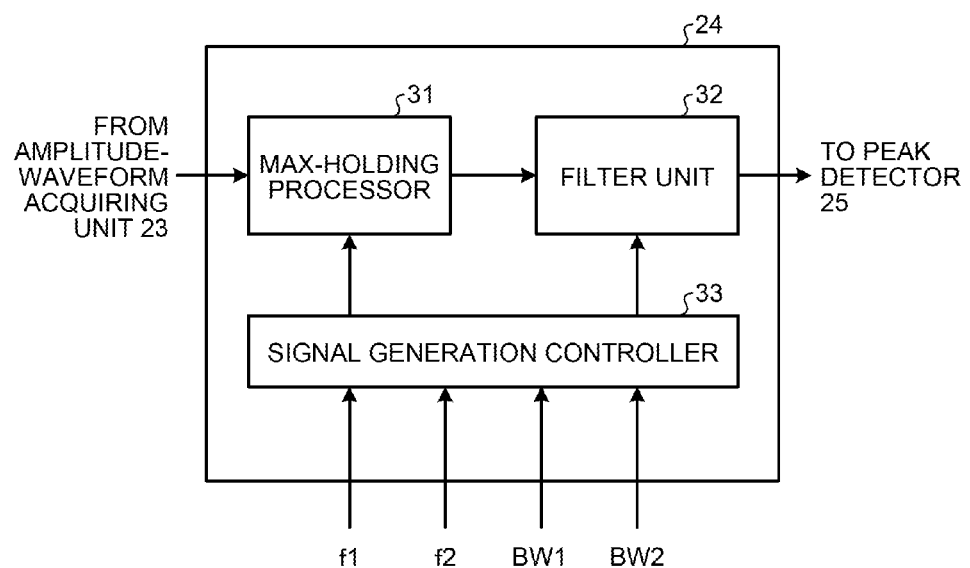
FIG. 6 is a block diagram illustrating an example of the configuration of a peak-detection signal generator in the first embodiment.

FIG. 6 is a block diagram illustrating an example of the configuration of the peak-detection signal generator in the first embodiment. In FIG. 6, the peak-detection signal generator 24 includes a max-holding processor 31, a filter unit 32, and a signal generation controller 33.

The signal generation controller 33 receives signals representing the carrier frequencies f1 and f2 and the carrier bandwidths BW1 and BW2. The signal generation controller 33 calculates a max-holding parameter and filter parameters from the f1, f2, BW1, and BW2, and outputs the max-holding parameter to the max-holding processor 31 and outputs the filter parameters to the filter unit 32.

Figure 7:
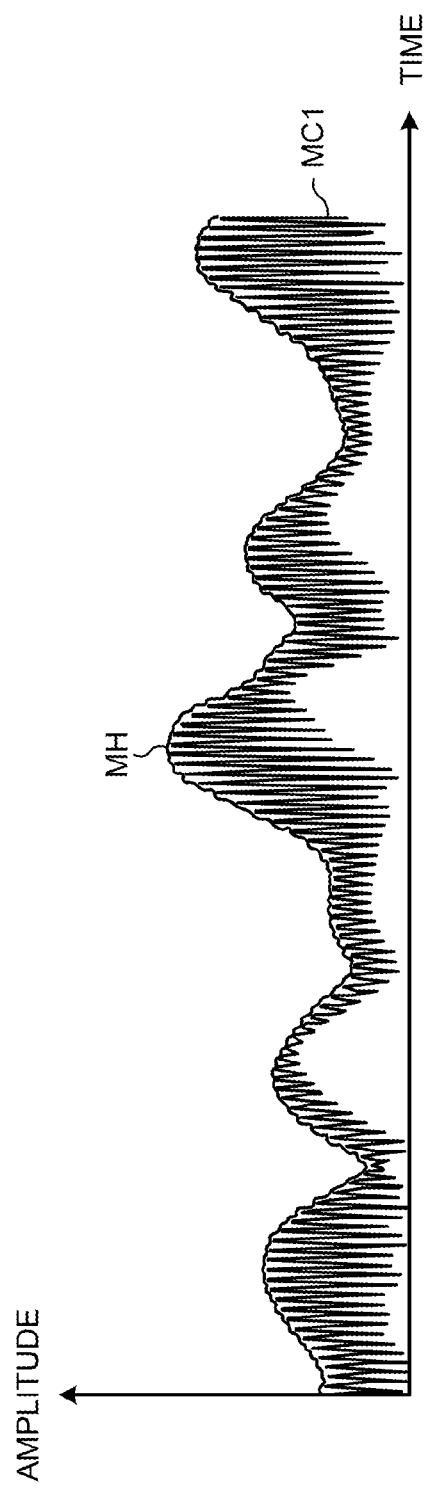
FIG. 7 is a chart for explaining max-holding processing performed in the first embodiment.
Figure 8:
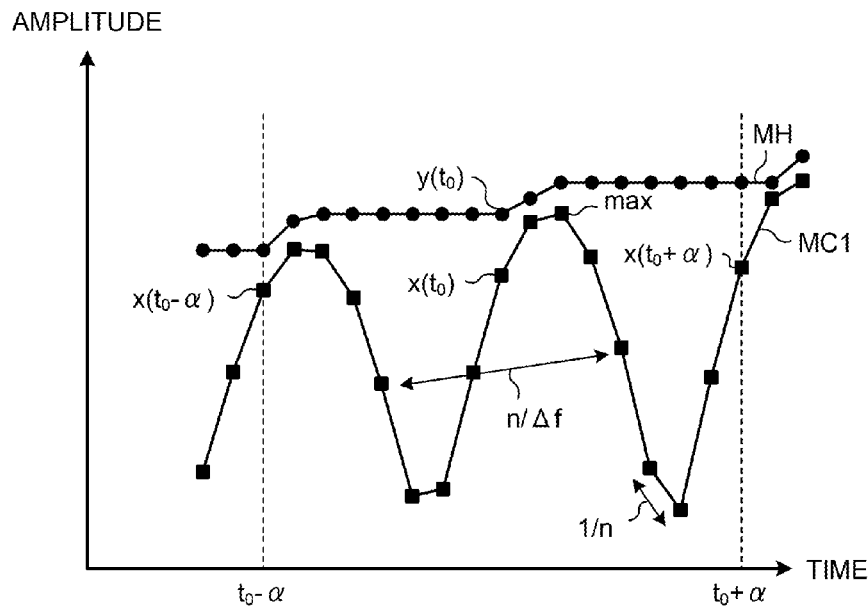
FIG. 8 is a chart for explaining the max-holding processing performed in the first embodiment.

The max-holding processor 31 generates a max-holding signal MH illustrated in FIG. 7 from the amplitude signal MC1, and outputs the generated max-holding signal MH to the filter unit 32. That is, the max-holding processor 31 generates the max-holding signal MH in a manner illustrated in FIG. 8. FIGS. 7 and 8 are charts for explaining the max-holding processing performed in the first embodiment.

More specifically, where an input signal to the max-holding processor 31 at the time of t=$t_0$ is x($t_0$) and an output signal from the max-holding processor 31 at the time of t=$t_0$ is y($t_0$), the y($t_0$) in FIG. 8 is expressed by the following Expression (1).

$$y(t_0)=\max[x(t_0-\alpha), x(t_0-\alpha+1), \ldots x(t_0-1), x(t_0), x(t_0+1), \ldots x(t_0+\alpha-1), x(t_0+\alpha)] \quad (1)$$

In Expression (1), the α is a sample range in the max-holding, and is the sample range calculated by "n/Δf" when a sampling rate is defined as "n." The max[ ] is a function to acquire a maximum value. The sample range α is calculated by the signal generation controller 33 based on the carrier frequencies f1 and f2 and the sampling rate n, and is set to the max-holding processor 31 as the max-holding parameter. The sampling rate n is known by the max-holding processor 31. The carrier interval Δf is calculated by the signal generation controller 33 based on the carrier frequencies f1 and f2. In FIG. 8, the amplitude signal MC1 with a period of eight samples is illustrated as one example where α=8. At this time, the "x($t_0$+2)" that has a maximum amplitude value ("max" in FIG. 8) within the range of "$(t_0-\alpha) \leq t \leq (t_0+\alpha)$" is the max-holding value $y(t_0)$ of the $x(t_0)$.

The max-holding processor 31 sequentially acquires a maximum amplitude value $y(t_0)$ within the sample range α while shifting the sample range α in the time axis direction by one sample in sequence. Then, as illustrated in FIG. 8, the max-holding processor 31 generates the max-holding signal MH that is represented by a waveform sequentially connecting a plurality of acquired maximum amplitude values $y(t_0)$.

Figure 9:
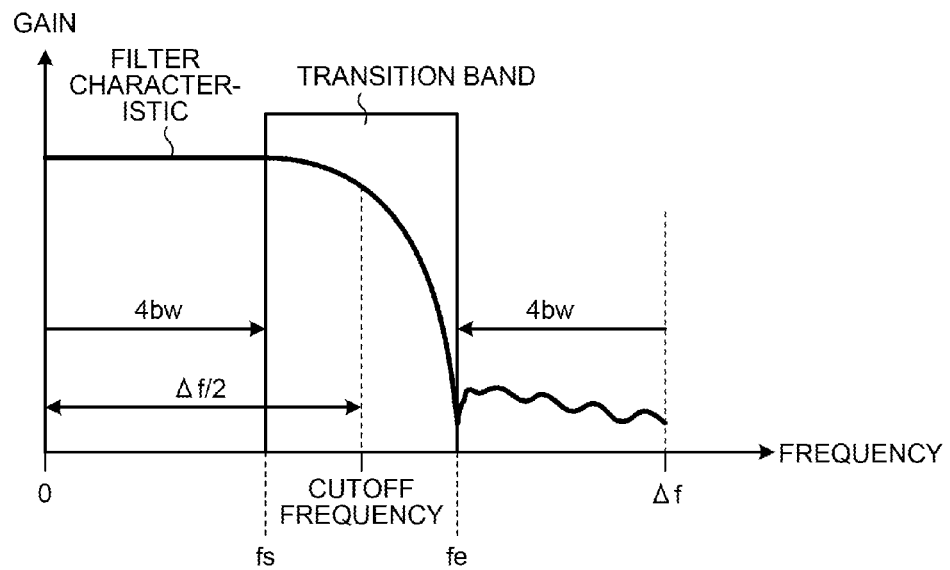
FIG. 9 is a chart for explaining the setting of filter parameters in the first embodiment.

In contrast, the signal generation controller 33 calculates a cutoff frequency and a transition band in a manner illustrated in FIG. 9 as the filter parameters to set to the filter unit 32. FIG. 9 is a chart for explaining the setting of filter parameters in the first embodiment. The "transition band" represents a frequency band of up to the frequency fe at which the gain of the filter unit 32 completely falls off from the frequency fs at which the gain of the filter unit 32 begins to fall off.

That is, the signal generation controller 33 sets "Δf/2" to the filter unit 32 as the cutoff frequency based on the carrier interval Δf, for example. The signal generation controller 33 further sets, based on the carrier bandwidths BW1 and BW2, "4bw" as the frequency fs to the filter unit 32 and "Δf−4bw" as the frequency fe, for example. The carrier bandwidths BW1 and BW2 have been defined as the same value of "bw."

The filter unit 32 operates as a low-pass filter (LPF), in accordance with the filter parameters set by the signal generation controller 33. That is, when a typical window method is used, the filter unit 32 operates as an LPF having a filter characteristic illustrated in FIG. 9, in accordance with the cutoff frequency and the transition band, for example. When the Remez method is used, the filter unit 32 operates as an LPF having a filter characteristic illustrated in FIG. 9, in accordance with the frequency fs and the frequency fe, for example. When the Remez method is used, the signal generation controller 33 sets the frequency fs and the frequency fe to the filter unit 32 as the filter parameters.

By the max-holding signal MH illustrated in FIG. 7 being filtered by the filter unit 32, the peak-coupled signal EN illustrated in FIG. 5 is obtained. That is, the filter unit 32 generates the peak-coupled signal EN by filtering the max-holding signal MH based on the carrier frequencies f1 and f2 and the carrier bandwidths BW1 and BW2.

As in the foregoing, in accordance with the first embodiment, the peak suppression apparatus 7 includes the amplitude-waveform acquiring unit 23, the peak-detection signal generator 24, the peak detector 25, and the peak suppressing unit 5. The amplitude-waveform acquiring unit 23 acquires the amplitude signal MC1 that is represented by the amplitude waveform of the multicarrier signal. The peak-detection signal generator 24 generates the peak-coupled signal EN that is represented by a waveform sequentially connecting a plurality of peak points adjacent to one another in the amplitude signal MC1, as the peak detection signal. The peak detector 25 detects a peak value and peak timing of the multicarrier signal by using the peak detection signal. The peak suppressing unit 5 suppresses the peak of the multicarrier signal, based on the detected peak value and peak timing.

Figure 1:
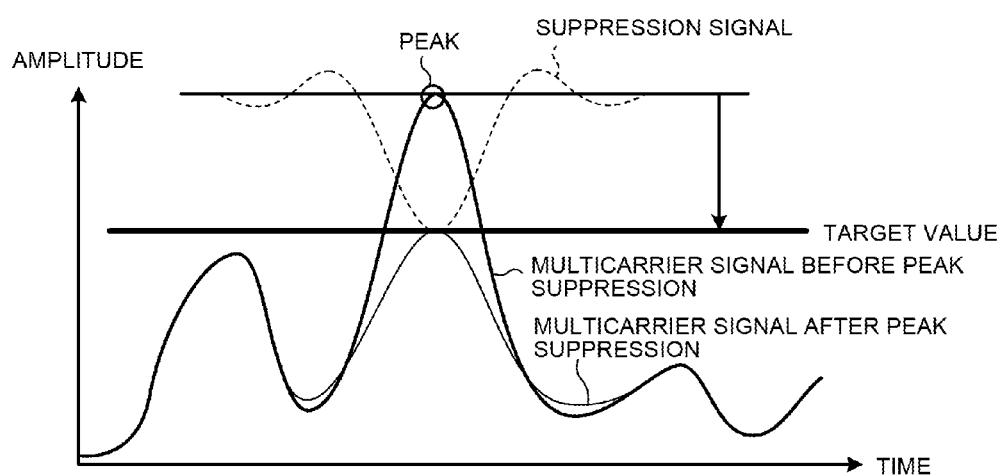
FIG. 1 is a chart illustrating one example of peak suppression.
Figure 2:
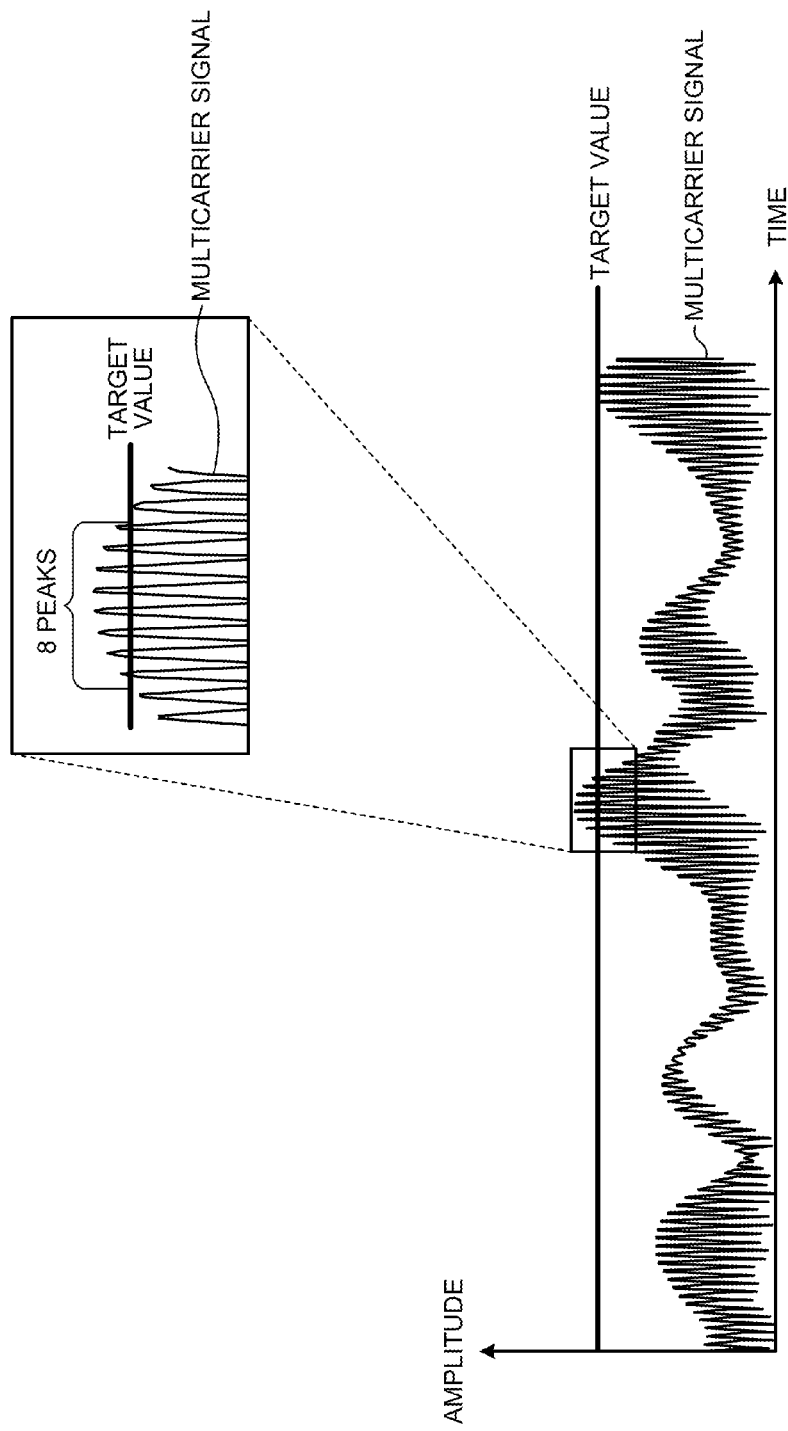
FIG. 2 is a diagram for explaining a problem.

As a consequence, the number of peaks in the amplitude waveform can be reduced. Hence, as illustrated in FIG. 2, even when a plurality of peaks exceeding the target value are present in the multicarrier signal within a short time range, those peaks can be treated as a single peak of the peak P1 or the peak P2 as illustrated in FIG. 5. Consequently, even when a plurality of peaks exceeding the target value are present in the multicarrier signal within a short time range, a single optimal peak timing within the short time range can be detected. Thus, a single optimal timing of adding an impulse response signal out of a plurality of peak timings that correspond to the peaks exceeding the target value can be determined in response to various patterns of the multicarrier signal. Consequently, in accordance with the first embodiment, the processing to determine the optimal timing of adding an impulse response signal is made simple, and thereby the circuit scale of the radio transmission apparatus can be reduced.

In accordance with the first embodiment, the peak-detection signal generator 24 sequentially acquires a maximum amplitude value $y(t_0)$ within a given sample range α while shifting the given sample range α in the amplitude signal MC1 in sequence. The peak-detection signal generator 24 further generates the max-holding signal MH that is represented by the waveform sequentially connecting a plurality of acquired maximum amplitude values $y(t_0)$. The peak-detection signal generator 24 then generates the peak-coupled signal EN by filtering the max-holding signal MH based on the carrier frequencies f1 and f2 and the carrier bandwidths BW1 and BW2.

As a consequence, the peak-coupled signal EN as the peak detection signal can be generated by simple processing of the max-holding processing and the filtering processing.

[b] Second Embodiment

In a second embodiment, the configuration of the peak-detection signal generator 24 differs from that in the first embodiment.

<Configuration of Peak-Detection Signal Generator>

Figure 10:
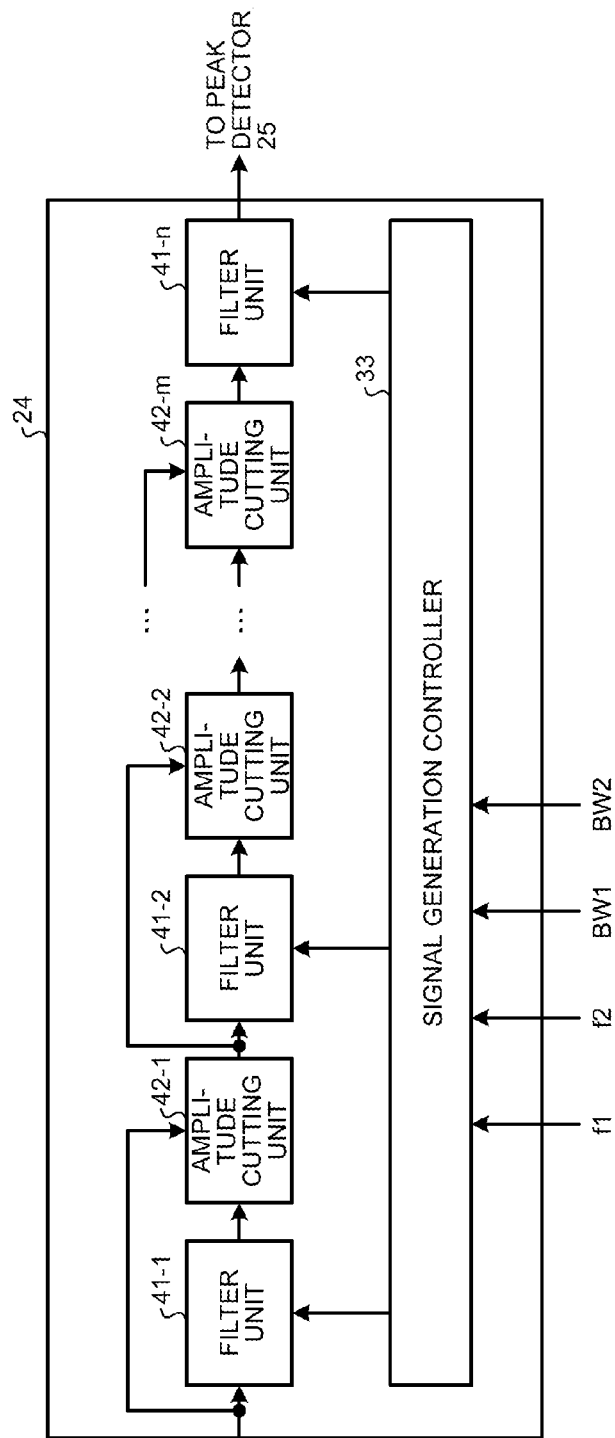
FIG. 10 is a block diagram illustrating an example of the configuration of a peak-detection signal generator according to a second embodiment.

FIG. 10 is a block diagram illustrating an example of the configuration of the peak-detection signal generator according to the second embodiment. In FIG. 10, the peak-detection signal generator 24 includes a plurality of filter units 41-1 to 41-$n$ and a plurality of amplitude cutting units 42-1 to 42-$m$ where "m=n−1." In the following description, when the filter units 41-1 to 41-$n$ are not distinguished, they may be collectively referred to as filter units 41. Furthermore, when the amplitude cutting units 42-1 to 42-$m$ are not distinguished, they may be collectively referred to as amplitude cutting units 42. The filter units 41 and the amplitude cutting units 42 are coupled alternately. The filter units 41 each operate as an LPF in the same manner as that in the first embodiment, and perform the filtering processing on the signal input to the filter units 41. The amplitude cutting units 42 each perform amplitude cutting processing in which a part of the amplitude of the signal input to the amplitude cutting units 42 is cut down based on the signal after the filtering processing performed by the filter units 41.

<Operation of Peak-Detection Signal Generator>

Figure 11:
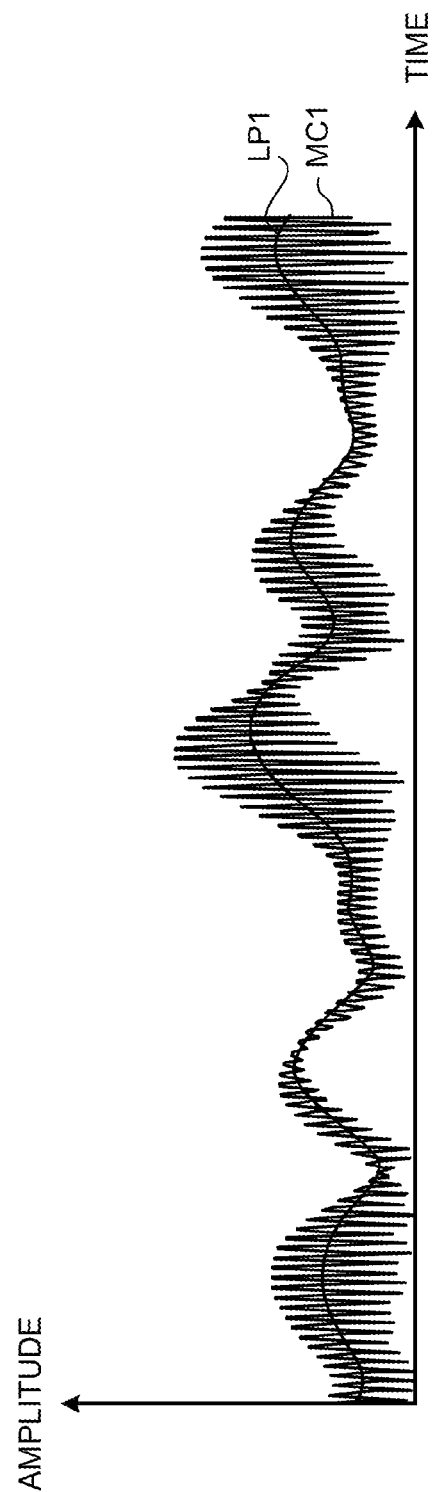
FIG. 11 is a chart for explaining the operation of the peak-detection signal generator in the second embodiment.
Figure 12:
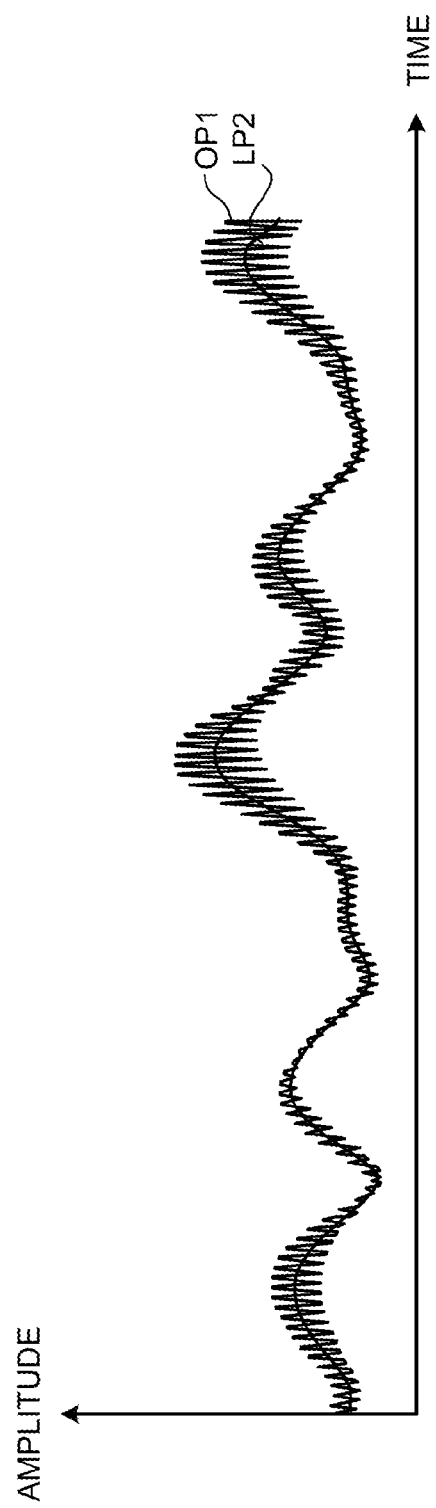
FIG. 12 is a chart for explaining the operation of the peak-detection signal generator in the second embodiment.
Figure 13:
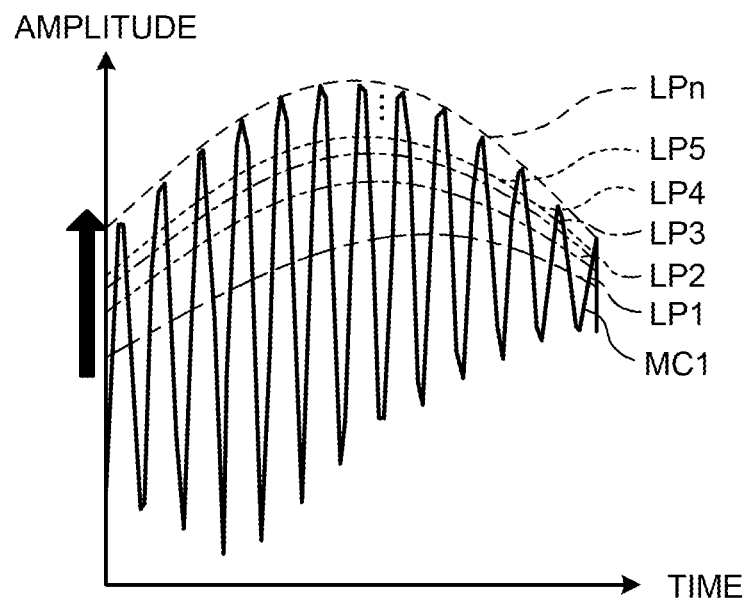
FIG. 13 is a chart for explaining the operation of the peak-detection signal generator in the second embodiment.

FIGS. 11 to 13 are charts for explaining the operation of the peak-detection signal generator in the second embodiment.

In the filter unit 41-1 and the amplitude cutting unit 42-1, the amplitude signal MC1 is input from the amplitude-waveform acquiring unit 23.

The filter unit 41-1 performs the filtering processing on the amplitude signal MC1 as illustrated in FIG. 11, and outputs a signal LP1 after filtering processing to the amplitude cutting unit 42-1. The waveform of the signal LP1 after filtering processing is to be a waveform that passes through the average of the amplitude variation of the amplitude signal MC1.

The amplitude cutting unit 42-1 cuts down the amplitude that is equal to or lower than the amplitude of the signal LP1 in the amplitude signal MC1, and outputs a signal OP1 after cutting as illustrated in FIG. 12 to the filter unit 41-2 and the amplitude cutting unit 42-2. By cutting down the amplitude that is equal to or lower than the amplitude of the signal LP1 in the amplitude signal MC1, the bottom envelope of the signal OP1 is clipped at the amplitude level of the signal LP1.

The filter unit 41-2 performs the filtering processing on the signal OP1 as illustrated in FIG. 12, and outputs a signal LP2 after filtering processing to the amplitude cutting unit 42-2. The waveform of the signal LP2 after filtering processing is to be a waveform that passes through the average of the amplitude variation of the signal OP1.

The amplitude cutting unit 42-2 cuts down the amplitude that is equal to or lower than the amplitude of the signal LP2 in the signal OP1, and outputs a signal OP2 after cutting to the filter unit 41 in a downstream stage and the amplitude cutting unit 42 in a downstream stage. By cutting down the amplitude that is equal to or lower than the amplitude of the signal LP2 in the signal OP1, the bottom envelope of the signal OP2 is clipped at the amplitude level of the signal LP2.

That is, the peak-detection signal generator 24 illustrated in FIG. 10 repeatedly performs, on the amplitude signal MC1 a number of times, the filtering processing based on the carrier frequencies f1 and f2 and the carrier bandwidths BW1 and BW2, and the amplitude cutting processing in which a part of the amplitude is cut down based on the signal after filter processing.

Consequently, by repeatedly performing the filtering processing and the amplitude cutting processing on the amplitude signal MC1 a number of times, as illustrated in FIG. 13, the waveforms of the signals LP1 to LP5 after filtering processing gradually approach the waveform of the peak-coupled signal EN and a signal LPn output from the filter unit 41-$n$ at the final stage is equivalent to the peak-coupled signal EN. That is, by repeatedly performing the filtering processing and the amplitude cutting processing on the amplitude signal MC1 a number of times, the peak-coupled signal EN as a peak detection signal can be obtained.

As in the foregoing, in accordance with the second embodiment, the peak-detection signal generator 24 generates the peak-coupled signal EN by repeatedly performing the filtering processing and the amplitude cutting processing on the amplitude signal MC1 a number of times.

As a consequence, the peak-coupled signal EN as the peak detection signal can be generated by simple processing of the filtering processing and the amplitude cutting processing.

[c] Third Embodiment

In a third embodiment, it differs from the first embodiment in that the signal used as a peak detection signal is switched, based on a carrier interval, between a peak-coupled signal and an amplitude signal.

As described above, as the carrier interval widens in the multicarrier signal, as illustrated in FIG. 2, the variation in amplitude of the multicarrier signal in the time axis direction becomes sharp. Hence, when the carrier interval widens, there are cases in which a plurality of peaks exceeding the target value are detected within a short time range.

In contrast, as the carrier interval narrows in the multicarrier signal, the variation in amplitude of the multicarrier signal in the time axis direction becomes gradual. Hence, when the carrier interval narrows, it often occurs that only one peak exceeding a target value is detected in a short time range.

The situation of "the carrier interval being wide" is a situation in which "N·bw≤Δf" holds true, for example, and the situation of "the carrier interval being narrow" is a situation in which "N·bw>Δf" holds true, for example. The "N" here is an integer, and is any of 4, 7, and 8, for example. The "N" is set to a value in which, out of the frequency components that can be cut out from the frequency spectrum of the multicarrier signal, the width of the frequency component that appears at zero Hertz is divided by bw (rounded down to the nearest decimal), for example.

<Configuration of Peak-Detection Signal Generator>

With reference to FIG. 6, the peak-detection signal generator 24 according to the third embodiment will be described.

The signal generation controller 33 calculates the carrier interval Δf based on the carrier frequencies f1 and f2. The signal generation controller 33 then determines whether the Δf satisfies the condition of "N·bw≤Δf" with "N·bw" as a threshold. The carrier bandwidths BW1 and BW2 have been defined as the same value of "bw."

If the Δf satisfies the condition of "N·bw≤Δf," that is, when the carrier interval is wide, the signal generation controller 33 then sets, in the same manner as those in the first embodiment, the max-holding parameter to the max-holding processor 31 and sets the filter parameters to the filter unit 32. Consequently, when the carrier interval is wide, the peak suppression is performed by using, as the peak detection signal, the peak-coupled signal EN generated in the same manner as that in the first embodiment.

In contrast, if the Δf does not satisfy the condition of "N·bw≤Δf," that is, when the carrier interval is narrow, the signal generation controller 33 then sets the sample range of "α=0" to the max-holding processor 31 as the max-holding parameter. Consequently, in the max-holding processor 31, the max-holding processing is not performed and the amplitude signal received from the amplitude-waveform acquiring unit 23 is output to the filter unit 32 as is. When the carrier interval is narrow, the signal generation controller 33 further sets a cutoff frequency of ∞ (infinity) to the filter unit 32 as the filter parameters. Consequently, the filter unit 32 operates as an LPF with the cutoff frequency of ∞, and thus in the filter unit 32, the filtering processing is not performed and the amplitude signal received from the max-holding processor 31 is output to the peak detector 25 as is. That is, when the carrier interval is narrow, the amplitude signal input to the peak-detection signal generator 24 ignores the max-holding processing and the filtering processing, and is output from the peak-detection signal generator 24 as is. Thus, when the carrier interval is narrow, the amplitude signal acquired by the amplitude-waveform acquiring unit 23 is to be the peak detection signal as is.

<Operation of Radio Transmission Apparatus>

Figure 14:
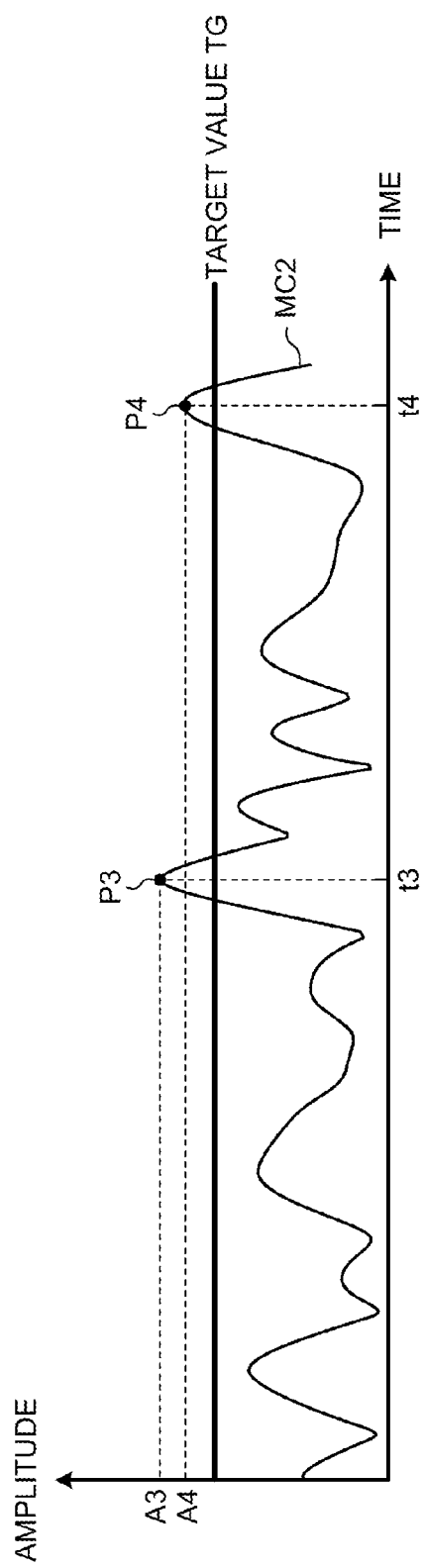
FIG. 14 is a chart for explaining the operation of a radio transmission apparatus according to a third embodiment.

FIG. 14 is a chart for explaining the operation of the radio transmission apparatus in the third embodiment. FIG. 14 illustrates an example of the operation when the carrier interval is narrow. The example of the operation when the carrier interval is wide is the same as that in the first embodiment, and thus its explanation is omitted.

The amplitude-waveform acquiring unit 23 acquires an amplitude signal MC2 as illustrated in FIG. 14 from the multicarrier signal received from the adder 22, and outputs the acquired amplitude signal MC2 to the peak-detection signal generator 24. Because the carrier interval is narrow, in the amplitude signal MC2, as compared with the amplitude signal MC1 in FIG. 5, the amplitude variation of the multicarrier signal in the time axis direction is gradual.

The peak-detection signal generator 24 outputs the amplitude signal MC2 to the peak detector 25 as is.

The peak detector 25 detects, by using the amplitude signal MC2 as the peak detection signal, peaks P3 and P4, which exceed the target value TG, of the amplitude signal MC2, and peak timing t3 of the peak P3 and peak timing t4 of the peak P4. The peak detector 25 further detects a peak value A3 of the peak P3 and a peak value A4 of the peak P4.

The suppression-amount adjusting unit 26 calculates "(A3−TG)/2" as the amount of suppression at the peak timing t3. The suppression-amount adjusting unit 26 further calculates "(A4−TG)/2" as the amount of suppression at the peak timing t4.

The impulse response generator 27 generates an impulse response signal I3 having "(A3−TG)/2" as a maximum amplitude at the peak timing t3 and outputs it to the subtracters 13-1 and 13-2. The impulse response generator 27 further generates an impulse response signal I4 having "(A4−TG)/2" as a maximum amplitude at the peak timing t4 and outputs it to the subtracters 13-1 and 13-2.

Consequently, coinciding with the peak timing t3, the impulse response signal I3 is subtracted from the transmission baseband signal 1 in the subtracter 13-1, and the impulse response signal I3 is subtracted from the transmission baseband signal 2 in the subtracter 13-2. Furthermore, coinciding with the peak timing t4, the impulse response signal I4 is subtracted from the transmission baseband signal 1 in the subtracter 13-1, and the impulse response signal I4 is subtracted from the transmission baseband signal 2 in the subtracter 13-2. Thus, each of the peak P3 and peak P4 is suppressed down to the target value TG. That is, the signal output from the adder 15 is to be the multicarrier signal in which the peaks are suppressed.

<Processing in Radio Transmission Apparatus>

Figure 15:
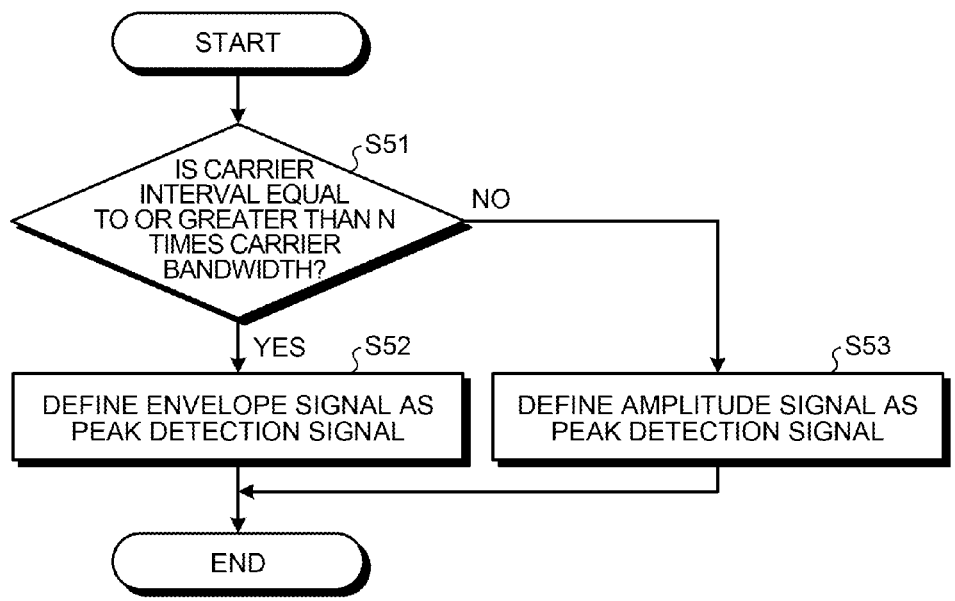
FIG. 15 is a flowchart for explaining the processing performed by the radio transmission apparatus in the third embodiment.

FIG. 15 is a flowchart for explaining the processing performed by the radio transmission apparatus in the third embodiment. The flowchart illustrated in FIG. 15 is started at regular time intervals.

The signal generation controller 33 in the peak-detection signal generator 24 determines whether "N·bw≤Δf" holds true, that is, whether the carrier interval Δf is equal to or greater than N times the carrier bandwidth bw (Step S51).

If the carrier interval Δf is equal to or greater than N times the carrier bandwidth bw (Yes at Step S51), then the peak-detection signal generator 24 outputs a peak-coupled signal generated in the same manner as that in the first embodiment to the peak detector 25 as the peak detection signal (Step S52).

In contrast, if the carrier interval Δf is below N times the carrier bandwidth bw (No at Step S51), then the peak-detection signal generator 24 outputs the amplitude signal received from the amplitude-waveform acquiring unit 23 as is to the peak detector 25 as the peak detection signal (Step S53).

As in the foregoing, in accordance with the third embodiment, when the carrier interval is equal to or greater than a given integer number of times the carrier bandwidth, the peak detector 25 detects a peak value and peak timing by using the peak-coupled signal as the peak detection signal. In contrast, when the carrier interval is below the given integer number of times the carrier bandwidth, the peak detector 25 detects a peak value and peak timing by using the amplitude signal as the peak detection signal.

As a consequence, when the carrier interval is narrow, the peak detection signal can be generated omitting the max-holding processing and the filtering processing, and thereby the processing of generating the peak detection signal when the carrier interval is narrow can be simplified.

[d] Fourth Embodiment

In a fourth embodiment, it is the same as the third embodiment in that the signal to be used as the peak detection signal is switched between the peak-coupled signal and the amplitude signal based on the carrier interval. However, in the fourth embodiment, it differs from the third embodiment in that the peak-detection signal generator 24 employs the configuration in the second embodiment (FIG. 10).

<Configuration of Peak-Detection Signal Generator>

With reference to FIG. 10, the peak-detection signal generator 24 according to the fourth embodiment will be described.

The signal generation controller 33 calculates the carrier interval Δf based on the carrier frequencies f1 and f2. The signal generation controller 33 then determines whether the Δf satisfies the condition of "N·bw≤Δf" with "N·bw" as a threshold. The carrier bandwidths BW1 and BW2 have been defined as the same value of "bw."

When the Δf satisfies the condition of "N·bw≤Δf," that is, when the carrier interval is wide, the signal generation controller 33 sets, in the same manner as that in the second embodiment, the filter parameters to the filter units 41. Consequently, when the carrier interval is wide, the peak suppression is performed by using the peak-coupled signal EN generated in the same manner as that in the second embodiment, as the peak detection signal.

In contrast, when the Δf does not satisfy the condition of "N·bw≤Δf," that is, when the carrier interval is narrow, the signal generation controller 33 sets a cutoff frequency of ∞ (infinity) to the filter units 41 as the filter parameters. Consequently, the filter units 41 operate as an LPF with the cutoff frequency of ∞, and thereby the filtering processing is not performed in the filter units 41 and the amplitude signal received from a functional unit in the upstream stage is output as is to a functional unit in the downstream stage. Thus, in the amplitude cutting units 42, because the signal to be the target of amplitude cutting processing and the signal to be the reference of the amplitude cutting processing are the same, the amplitude cutting processing is not to be performed.

That is, when the carrier interval is narrow, the amplitude signal input to the peak-detection signal generator 24 ignores the filtering processing and the amplitude cutting processing, and is output as is from the peak-detection signal generator 24. Thus, when the carrier interval is narrow, the amplitude signal acquired by the amplitude-waveform acquiring unit 23 is to be the peak detection signal as is.

Consequently, in accordance with the fourth embodiment, when the carrier interval is equal to or greater than a given integer number of times the carrier bandwidth, the peak detector 25 detects a peak value and peak timing by using the peak-coupled signal as the peak detection signal. In contrast, when the carrier interval is below the given integer number of times the carrier bandwidth, the peak detector 25 detects a peak value and peak timing by using the amplitude signal as the peak detection signal.

Consequently, when the carrier interval is narrow, the peak detection signal can be generated omitting the filtering processing and the amplitude cutting processing, and thereby the processing of generating the peak detection signal when the carrier interval is narrow can be simplified.

In the foregoing, the first to the fourth embodiments have been described.

[e] Other Embodiments

1. In the first to the fourth embodiments, the Δf has been used as the carrier interval. However, in place of the Δf, the Δfg may be used as the carrier interval. The carrier interval Δfg is calculated based on the carrier frequencies f1 and f2 and the carrier bandwidths BW1 and BW2. When the Δfg is used as the carrier interval, the cutoff frequency, the frequencies fs and fe indicative of a transition band, and the sample range α are calculated in the following manner. Note that the carrier bandwidths BW1 and BW2 are defined as the same value of "bw."

Cutoff frequency=(Δ$fg$+$bw$)/2

Frequency $fs$=4$bw$

Frequency $fe$=Δ$fg$−3$bw$

Sample range α=Sampling rate/(Δ$fg$+$bw$)

Furthermore, when the Δfg is used as the carrier interval, in the third and the fourth embodiments, whether the carrier interval is wide or narrow is determined in the following manner. That is, in place of determining whether the carrier interval is wide or narrow by determining whether the condition of "8bw≤Δf" is satisfied, it is preferable that whether the carrier interval is wide or narrow be determined by determining whether the condition of "7bw≤Δfg" is satisfied.

2. The peak suppression apparatus 7 is implemented, as hardware, with a field programmable gate array (FPGA), a large-scale integrated circuit (LSI), or a processor, for example. The processor, as one example, includes a central processing unit (CPU) and a digital signal processor (DSP). The peak suppression apparatus 7 may further include a memory. The memory stores therein the sampling rate n, for example.

In accordance with the disclosed embodiments, the circuit scale of the radio transmission apparatus that performs the peak suppression of a multicarrier signal can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A peak suppression apparatus comprising:
a memory; and
a processor coupled to the memory, wherein
the processor executes a process comprising:
    acquiring a first signal represented by an amplitude waveform of a multicarrier signal;
    generating a second signal represented by a waveform sequentially connecting a plurality of peak points adjacent to one another in the first signal based on carrier frequencies and carrier bandwidths of the multicarrier signal;
    detecting a peak value and a peak timing of the multicarrier signal by using the second signal; and
    suppressing a peak of the multicarrier signal based on the peak value and the peak timing, wherein
    the generating includes sequentially acquiring maximum amplitude values within a given sample range in the first signal while shifting the given sample range in sequence, generating a third signal represented by a waveform sequentially connecting the acquired maximum amplitude values, and generating the second signal by filtering the third signal based on the carrier frequencies and the carrier bandwidths of the multicarrier signal.

2. A peak suppression apparatus comprising:
a memory; and
a processor coupled to the memory, wherein
the processor executes a process comprising:
    acquiring a first signal represented by an amplitude waveform of a multicarrier signal;
    generating a second signal represented by a waveform sequentially connecting a plurality of peak points adjacent to one another in the first signal based on carrier frequencies and carrier bandwidths of the multicarrier signal;
    detecting a peak value and a peak timing of the multicarrier signal by using the second signal; and
    suppressing a peak of the multicarrier signal based on the peak value and the peak timing, wherein
    the generating includes generating the second signal by repeatedly performing, on the first signal a number of times, filtering processing based on the carrier frequencies and the carrier bandwidths of the multicarrier signal, and amplitude cutting processing for cutting down a part of amplitude of a signal after the filtering processing.

3. A peak suppression apparatus comprising:
a memory; and
a processor coupled to the memory, wherein
the processor executes a process comprising:
    acquiring a first signal represented by an amplitude waveform of a multicarrier signal;
    generating a second signal represented by a waveform sequentially connecting a plurality of peak points adjacent to one another in the first signal based on carrier frequencies and carrier bandwidths of the multicarrier signal;
    detecting a peak value and a peak timing of the multicarrier signal by using the second signal; and
    suppressing a peak of the multicarrier signal based on the peak value and the peak timing, wherein
    the detecting includes detecting the peak value and the peak timing by using the second signal when an interval between two carriers adjacent to each other in the multicarrier signal is equal to or greater than a threshold, and detecting the peak value and the peak timing by using the first signal when the interval between the two carriers is below the threshold.

* * * * *